(12) United States Patent
Kozloski et al.

(10) Patent No.: US 10,438,170 B2
(45) Date of Patent: Oct. 8, 2019

(54) BLOCKCHAIN FOR PROGRAM CODE CREDIT AND PROGRAMMER CONTRIBUTION IN A COLLECTIVE

(71) Applicant: International Business Machines Corporation, Armonk, NY (US)

(72) Inventors: James R. Kozloski, New Fairfield, CT (US); Clifford A. Pickover, Yorktown Heights, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 15/399,183

(22) Filed: Jan. 5, 2017

(65) Prior Publication Data
US 2018/0189732 A1    Jul. 5, 2018

(51) Int. Cl.
*G06F 9/44*    (2018.01)
*G06Q 10/10*    (2012.01)
(Continued)

(52) U.S. Cl.
CPC ............ *G06Q 10/101* (2013.01); *G06F 8/71* (2013.01); *G06F 8/30* (2013.01)

(58) Field of Classification Search
CPC ............ G06F 8/71; G06F 8/72; G06Q 10/101
(Continued)

(56) References Cited

U.S. PATENT DOCUMENTS

| 2002/0095300 A1* | 7/2002 | Parks | G06Q 40/04 705/1.1 |
| 2003/0149806 A1* | 8/2003 | Achacoso | G06Q 10/10 710/4 |

(Continued)

FOREIGN PATENT DOCUMENTS

| WO | 2009004551 A1 | 1/2009 |
| WO | 2015024129 A1 | 2/2015 |

(Continued)

OTHER PUBLICATIONS

Title: Blockchain challenges and opportunities: A Survey author: Z. Zheng et al, published on 2016.*

(Continued)

*Primary Examiner* — Chameli Das
(74) *Attorney, Agent, or Firm* — Harrington & Smith

(57) ABSTRACT

A system for producing a computer program code collaboratively using blockchain includes a plurality of computer nodes, the plurality of computer nodes forming a distributed network for collaborative work. Each of the computer nodes communicates directly with the others, and is operated by a user in accordance with a common smart contract. Contributions of each of the users are entered into the blockchain at respective computer nodes as blocks when transactions have been completed in accordance with the following steps: writing code for inclusion in said computer software program; submitting the code for the computer software program to the distributed network to complete a transaction to add a block with the code to the blockchain of the computer (Continued)

software program; detecting by the distributed network of the submission of code for the computer software program; and adding the code as a block to the blockchain of the computer software program.

19 Claims, 3 Drawing Sheets

(51) Int. Cl.
*G06F 8/71* (2018.01)
*G06F 8/30* (2018.01)

(58) Field of Classification Search
USPC .................................................. 717/100–103
See application file for complete search history.

(56) References Cited

U.S. PATENT DOCUMENTS

| | | | |
|---|---|---|---|
| 2003/0225698 A1* | 12/2003 | Stefik | G06F 21/10 705/51 |
| 2006/0117314 A1 | 6/2006 | Sato | G06F 21/121 717/174 |
| 2007/0240102 A1* | 10/2007 | Bello | G06F 8/36 717/104 |
| 2008/0016538 A1* | 1/2008 | Eyal | H04N 21/26258 725/83 |
| 2013/0340076 A1 | 12/2013 | Cecchetti et al. | |
| 2013/0346895 A1* | 12/2013 | Selgas | H04L 29/06 715/765 |
| 2014/0379632 A1* | 12/2014 | Gera | G06F 9/5061 707/608 |
| 2015/0206106 A1 | 7/2015 | Yago | |
| 2015/0332283 A1 | 11/2015 | Witchey | |
| 2016/0216286 A1* | 7/2016 | Holmes | G01N 35/00 |
| 2017/0031676 A1* | 2/2017 | Cecchetti | G06F 8/65 |
| 2017/0103167 A1* | 4/2017 | Shah | G06F 11/1464 |
| 2017/0206522 A1* | 7/2017 | Schiatti | G06Q 20/3829 |
| 2017/0344987 A1* | 11/2017 | Davis | G06Q 20/401 |
| 2017/0345011 A1* | 11/2017 | Salami | G06Q 20/42 |
| 2017/0358041 A1* | 12/2017 | Forbes, Jr. | H04L 69/325 |
| 2018/0039667 A1* | 2/2018 | Pierce | G06F 17/30371 |
| 2018/0041571 A1* | 2/2018 | Rogers | G06F 21/10 |
| 2018/0189732 A1* | 7/2018 | Kozloski | G06Q 10/101 |
| 2019/0004789 A1* | 1/2019 | Mills | G06F 8/70 |

FOREIGN PATENT DOCUMENTS

| | | | |
|---|---|---|---|
| WO | 2015085393 A1 | 6/2015 | |
| WO | 2016022864 A2 | 2/2016 | |

OTHER PUBLICATIONS

Title: An Improved Context free recognizer, author: Graham et al, source ACM, published on Jul. 1980.*
Wells, D.; "Collective Ownership"; 1999; XP Extreme Programming; http://www.extremeprogramming.org/rules/collective.html; whole document (1 page).
Iprodev; "20 Best Code Editors for Real Time Collaboration"; Apr. 15, 2015; http://www.extremeprogramming.org/rules/collective.html; whole document (13 pages).
Collabedit; "Online Code Editor"; 2016; http://colabedit.com; whole document (2 pages).
PSGS; "Using Block-Chains to Transfer Data"; May 16, 2014; https://psgs.tk/blog/thoughts/2014/05/16/transferring-data-with-blockchains/; whole document (5 pages).
Doan, A. et al.; "Crowdsourcing Applications and Platforms: A Data Management Perspective"; Aug. 2011; Proceedings of the VLDB Endowment 4(12); pp. 1508-1509.
Wikipedia; "Design by contract"; Aug. 25, 2016; https://en.wikipedia.org/wiki/Design_by_contract; whole document (7 pages).
Brakeville, S. et al.; "Blockchain basics: Introduction to business ledgers"; Jul. 28, 2016; IBM Corporation, developerWorks; whole document (6 pages).
Wikipedia; "Blockchain (database)"; Oct. 31, 2016; https://en.wikipedia.org/wiki/Blockchain_(database); whole document (7 pages).

* cited by examiner

BLOCKCHAIN FOR PROGRAM CODE CREDIT AND PROGRAMMER CONTRIBUTION IN A COLLECTIVE

TECHNICAL FIELD

This disclosure relates to collaborative computer coding in which a number of computer programmers collaborate to produce a software product.

BACKGROUND

Programmers contributing to code for an evolving software product often do so in collaboration with many other parties. As such, they may be creating code in a public or collaborative kind of space for credit, creativity, debugging, and reward. Currently, there is no single fair way to measure or to determine the contribution of programmers in a public, or even in a private, space. There is accordingly a need for a secure and robust approach to track and to append information related to collaborative coding for the purpose of credit, reward, and dispute resolution, and for other purposes.

SUMMARY

In one aspect of the present invention, a system comprises a plurality of computer nodes, the plurality of computer nodes forming a distributed network for collaborative work. Each of the computer nodes of the plurality communicates directly with each of the other computer nodes of the plurality, and is operated by a user in accordance with a common smart contract to produce a computer program code collaboratively using blockchain.

Contributions of each of the users are entered into the blockchain at respective computer nodes as blocks when transactions have been completed in accordance with the following: writing code for inclusion in the computer software program; submitting the code for the computer software program to the distributed network to complete a transaction to add a block with the code to the blockchain of the computer software program; detecting by the distributed network of the submission of code for the computer software program; and adding the code as a block to the blockchain of the computer software program.

Another aspect of the present invention is a method for a plurality of computer nodes. The plurality of computer nodes forms a distributed network for collaborative work, wherein each of the computer nodes of the plurality communicates directly with each of the other computer nodes of the plurality, and each of the computer nodes is operated by a user in accordance with a common smart contract to produce a computer program code collaboratively using blockchain.

As above, contributions of each of the users are entered into the blockchain at respective computer nodes as blocks when transactions have been completed. The method comprises: writing code for inclusion in said computer software program; submitting the code for the computer software program to the distributed network to complete a transaction to add a block with the code to the blockchain of the computer software program; detecting by the distributed network of the submission of code for the computer software program; and adding the code as a block to the blockchain of the computer software program.

BRIEF DESCRIPTION OF THE DRAWINGS

The foregoing and other aspects of these teachings are made more evident in the following detailed description, when read in conjunction with the attached drawing figures.

DETAILED DESCRIPTION

Figure 1:
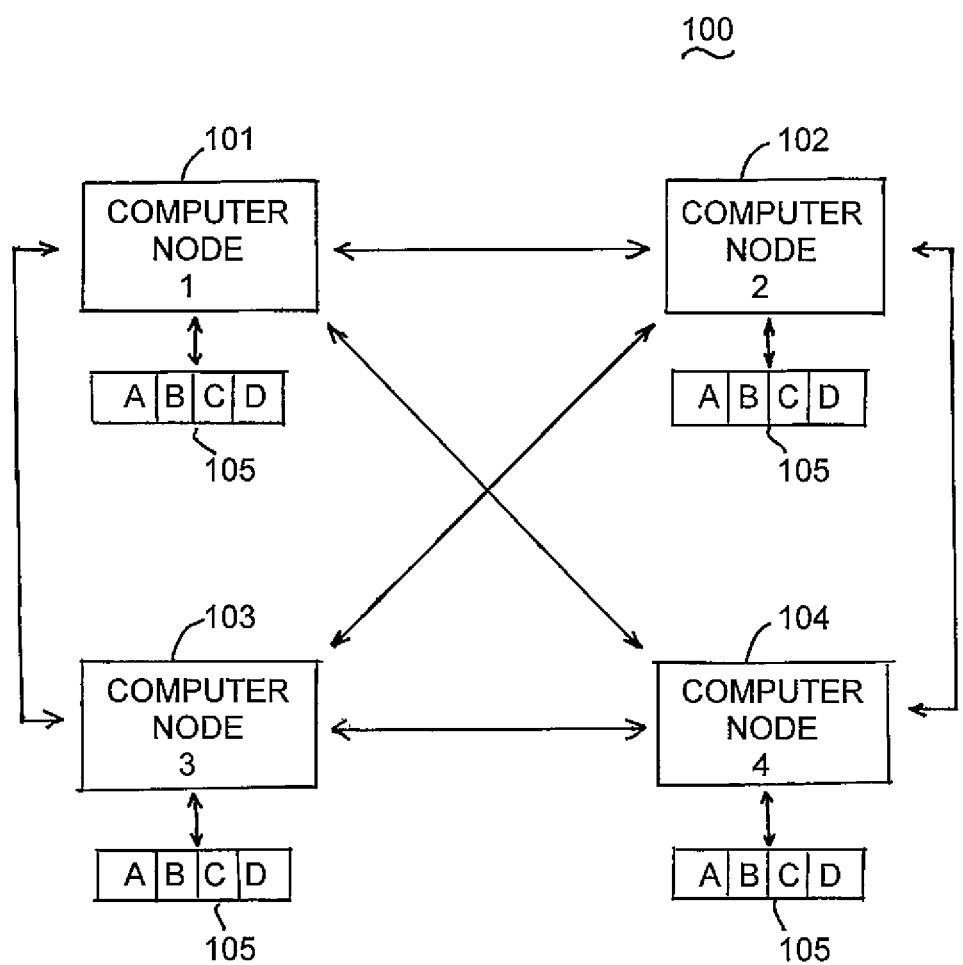
FIG. 1 is a schematic illustration of a distributed network in the context of the present invention.

As an introduction to the description of the present invention, it will be useful to review some necessary terminology. A blockchain is a distributed database that maintains a continuously growing list of data records, which have been hardened against tampering and revision. The blockchain consists of data structure blocks, which exclusively hold data in initial blockchain implementations, and both data and programs in some of the more recent implementations. Each block in the blockchain holds batches of individual transactions and the results of any blockchain executables. Each block contains a timestamp and information linking it to a previous block in the blockchain.

The blockchain is considered to be the main technical innovation of bitcoin, where the blockchain serves as the public ledger of all bitcoin transactions. Bitcoin is peer-to-peer (P2P); every user is allowed to connect to the network, send new transactions to the blockchain; verify transactions, and create new blocks. For this reason, the blockchain is described to be permissionless.

Although, in the present invention, blockchain is not being used for currency transactions, it is useful to note that, in the context of its first digital currency, bitcoin, a blockchain is a digital ledger recording every bitcoin transaction that has ever occurred. The digital ledger is protected by powerful cryptography typically considered to be impossible to break. More importantly, though, the blockchain resides not in a single server, but across a distributed network of computers. Accordingly, whenever new transactions occur, the blockchain is authenticated across this distributed network, and then the transaction is included as a new block on the chain.

Transactions are the content stored in the blockchain, and are created by participants using the system. Although, as stated above, blockchain is not being used for currency transactions, it is useful to note that, in the case of cryptocurrencies, a transaction is created whenever a cryptocurrency owner sends cryptocurrency to someone else. In this regard, a cryptocurrency should be understood to be a medium of exchange using cryptography to secure the transactions and to control the creation of additional units of the currency. System users create transactions that are passed from node to node, that is, computer to computer, on a best-effort basis. The system implementing the block chain defines a valid transaction. In cryptocurrency applications, a valid transaction must be digitally signed, and must spend one or more unspent outputs of previous transactions; the sum of transaction outputs must not exceed the sum of transaction inputs.

Blocks record and confirm when and in what sequence transactions enter and are logged into the block chain. Blocks are created by users known as "miners", who use specialized software or equipment designed specifically to create blocks. In a cryptocurrency system, miners are incentivized to create blocks to collect two types of rewards: a pre-defined per-block award, and fees offered within the transactions themselves, payable to any miner who successfully confirms the transaction.

Every node in a decentralized system has a copy of the blockchain. This avoids the need to have a centralized database managed by a trusted third party. Transactions are broadcast to the network using software applications. Network nodes can validate transactions, add them to their copy, and then broadcast these additions to other nodes. To avoid the need for a trusted third party to timestamp transactions, decentralized block chains use various timestamping schemes, such as proof-of-work.

The advantages of blockchain for bitcoin include:
(1) The ability for independent nodes to converge on a consensus of the latest version of a large data set such as a ledger, even when the nodes are run anonymously, have poor interconnectivity, and have operators who are dishonest or malicious;
(2) The ability for any well-connected node to determine, with reasonable certainty, whether a transaction does or does not exist in the data set;
(3) The ability for any node that creates a transaction to determine, after a confirmation period, with a reasonable level of certainty, whether the transaction is valid, is able to take place, and become final, that is to say, that no conflicting transactions were confirmed into the block chain elsewhere that would invalidate the transaction, such as the same currency units "double-spent" somewhere else;
(4) A prohibitively high cost to attempt to rewrite or alter transaction history;
(5) Automated conflict resolution that ensures that conflicting transactions, such as two or more attempts to spend the same balance in different places, never become part of the confirmed data set.

As noted above, programmers contributing to code for an evolving software product often do so in collaboration with many other parties. As such, they may be creating code in a public or collaborative kind of space for credit, creativity, debugging, and reward. Currently, there is no single fair way to measure or to determine the contribution of programmers in a public, or even in a private, space. In accordance with the present invention, blockchain provides a useful means for tracking and storing the contributions of programmers. It is also useful for dispute resolution. This is because no single entity has complete control of code and edits.

One of the goals of the present invention is "credit assignment and reward." Blockchain is particularly useful when coding is done in a public space, is non-centralized, and when "bounties" are offered for certain contributions. Trust, or the lack thereof, which is a significant issue in (business) process execution and transformation, can therefore be addressed.

There has long been a need for a secure and robust approach to track and to append information related to collaborative coding for the purpose of credit, reward, and dispute resolution, and for other purposes. The present invention meets this need and may also implement a common smart contract to determine that coders, that is, programmers offering services and work products, are meeting their agreements about coding. Code transactions and parameters associated with a stakeholder are compiled into a chain of programmer transaction blockchain blocks. The chain can be considered a chronicle of a piece of software, such as a growing piece of complex code, and the code "status" path through its recent history or complete history can be tracked, along with its various programmers, though the lifetime and versions of the code, various history parameters, etc. Once the new block has been calculated, it can be appended to the stakeholder's application software history blockchain, as described above. The block may be updated in response to many triggers, such as, when a programmer selects a button on a graphical user interface (GUI) on a computer display showing a code editor to add code, when a unit test has been completed, when a code integration is completed, when an assigned work item is closed, and so forth.

FIG. 1 is a schematic illustration of a distributed network in the context of the present invention. A distributed network 100 of computer nodes 101, 102, 103, 104 is formed for the purpose of producing a computer software program in a collaborative process carried out by the programmers using the computer nodes 101, 102, 103, and 104. For example, one of the programmers, such as the one operating computer node 101, enters code for the computer software program as a transaction, which is communicated to the other computer nodes of the distributed network and entered onto the blockchain 105 as a new block, such as block "D", at the end of each. As a consequence, each programmer in the distributed network of computer nodes has the same blockchain, which is a record of the work done by all of the members of the distributed network in the order in which the work was submitted.

Figure 2:
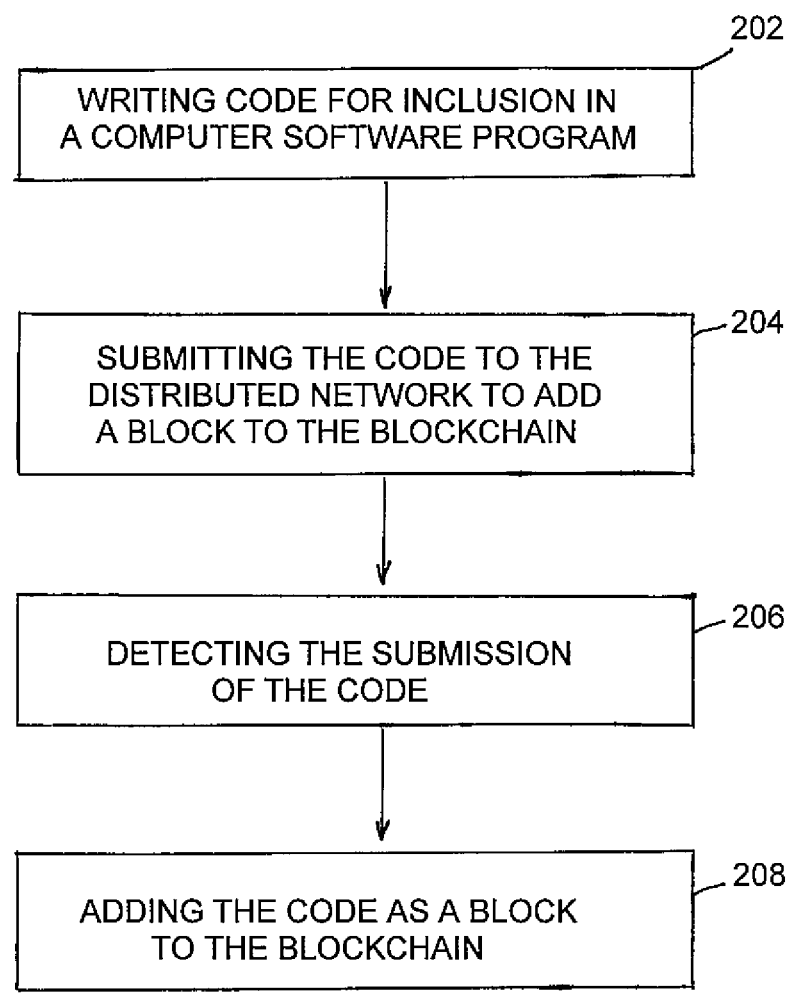
FIG. 2 is a flow chart illustrating the steps carried out in the method and system of the present invention.

FIG. 2 is a flow chart illustrating the steps carried out in the method and system of the present invention. First, in block 202, one of the programmers writes code for inclusion in a computer software program. At block 204, the programmer submits the code for the computer software program to the distributed network to complete a transaction to add a block with the code to the blockchain of the computer software program. At block 206, the submission of the code for the computer software program is detected by the distributed network. Finally, the code is added as a block to the blockchain of the computer software program in block 208.

Figure 3:
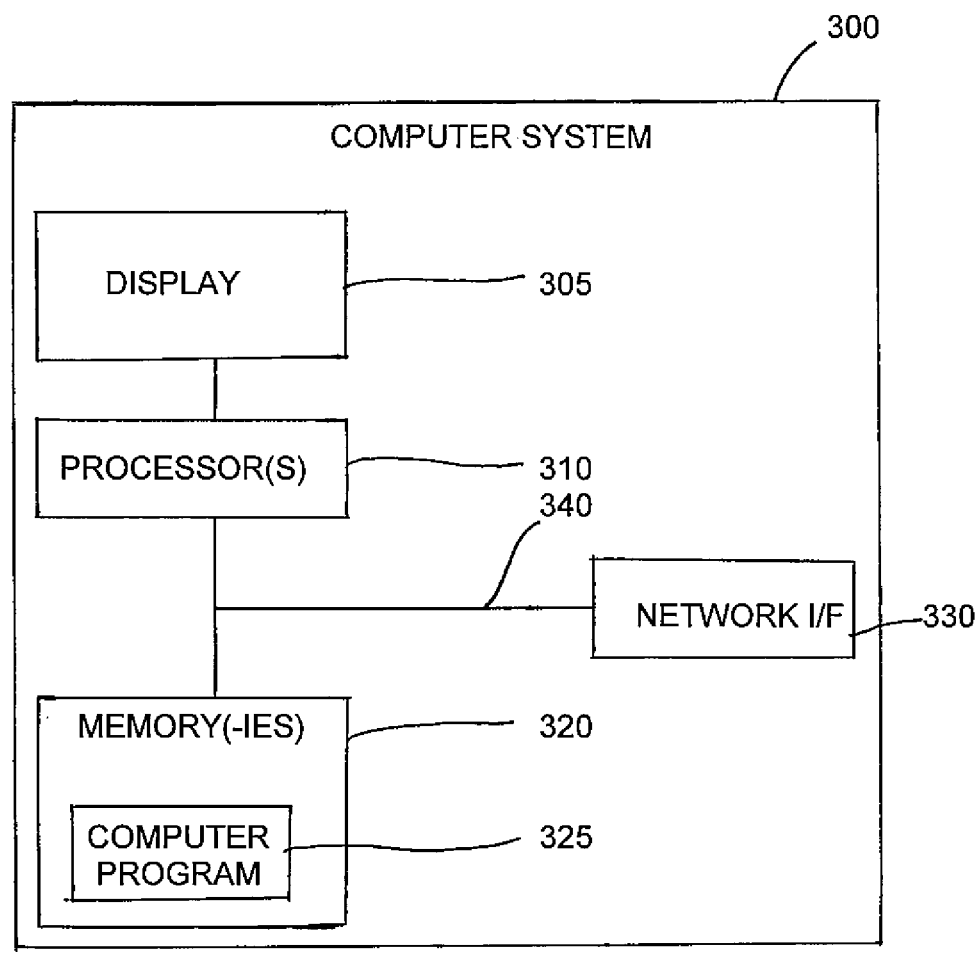
FIG. 3 shows an exemplary computer system for use as a computer node in the distributed network.

FIG. 3 shows an exemplary computer system 300 for use as a computer node in the distributed network 100. The computer system 300 includes a display 305, one or more processors 310, one or more memories 320, and one or more network interfaces 330, interconnected using one or more buses 340. The one or more memories 320 include a computer program 325 designed to cause the computer system 300 to perform one or more of the operations described herein when used as a computer node in the distributed system 100.

It should be noted that heretofore Software Version Control (SVC), GIT, and other approaches have been used to track code contributions in a collaborative coding environment, wherein the code is held in a repository by a central "owner." In these prior-art approaches, version control keeps track of all contributions and annotations made by the coder upon "checking in the code" to the repository.

In an embodiment of the present invention, prior-art organization methods and technology are used to maintain change logs, differences, and annotations by coders, but central ownership of the code is not required. This is paradoxical, because, without a central repository, code versions may fork and different coders may work on different versions that they share with each other. In this way, a code can "evolve" independently of the central repository, and, further, the use of blockchain for version control allows the coders to ensure that their work will never be distributed under any license, since "ownership" of the code can never be claimed by any individual. Instead, the work contribution of coders may be verified against a particularly useful instance of the code by checking the code into the blockchain and requesting from the blockchain an assessment of the contribution history of the particular instance of the code.

The present invention also envisions a central "owner" of a project releasing an "ancestral" code into the public domain with the intention of allowing block-chain-based version control to track mutations and evolution of the code by different parties, and even to offer "bounties" for successful achievement of a particular functionality, reliability, or bug-free condition, all while not enforcing a strict central repository for check-in and check-out. In this way, teams may form naturally and innovate on different paths, without having access to the work of other teams, unless the other teams actually share access to their versions of the code. The blockchain ensures confidentiality and trust among different interests in this version control system, such that new and innovative crowd-sourcing techniques and methods may be implemented.

Various customized parameters may be added to the growing block, including:
  A chronicle of code contributions through the "life" of the code and through versions of the code, or for a period of time, T;
  The software application's various programmers though life, stored, for example, as a programmer ID;
  "Ratings" of code additions, including indications regarding risky coding;
  One or more lines of code, debug outcomes, quality/efficiency of code;
  Part or all of test case execution traces/results;
  Frequency of code commit to code repository;
  One or more units of source code, sets of one or more computer program modules together with associated control data, usage procedures, and operating procedures;
  A code module, function or procedure, an entire interface, such as a class in object-oriented programming), an individual method, short code fragments created by programmers or occasionally by white-box testers during the development process;
  Greenness of code, that is, energy-saving efficiency when on different devices, storage efficiency, and CPU efficiency; Code testing and deployment environment information;
  Comprehensibility ratings of code and dates of additions;
  The role of the programmer, such as, a developer, scrub master, lead developer, etc., and the reward/rating received to date;
  Coding work items and types, such as high, medium, low, and urgent, of work-item; note that typically highly prioritized or core component development is assigned to skilled developers;
  Updating the status of the work item/product, such as new-fin progress, 20% completed, 70% completed, 100% completed, or closed;
  Time spent in each stage of progress; and
  A multidimensional vector related to unit test outcomes, storage efficiency, assessment of comprehensibility for different cohorts or teams of coders, and code compliance parameters.

The customized parameters may further be organized or tagged within the blockchain block as:
  requirements gathering;
  database design and development;
  services;
  user experience, graphic design;
  user interface development;
  deployment;
  testing; and/or
  performance monitoring and enhancement.

The decision to include one or more of the customized parameters, including metadata, in the blockchain block may be based on the criticality of importance of the code/module/software under development or maintenance.

Optionally, there may be one or more code security blocks including:
  coder location;
  coder capabilities (expertise level, along with contractual obligations);
  coding behavior (erratic behavior or a history of concerns);
  code editor model (in case some code editors produce more reliable or secure code);
  contextual information related to security concerns (for example, external library or API usage); and
  compliance concerns (for example, freedom of action or license issues; MIT vs GNU) based on the nature of code/module/software under development.

A transaction may also include a consideration of: registering a work-product, a piece of code, a programmer, updating code details relating to purpose or customers, committing/pushing code to a code repository, wherein these kinds of transactions are validated by validating peers. Validating peers or devices may be any of: other programmers or supervisors, expert system, regulatory body, compliance bodies, etc.

In some sense, the present invention facilitates the contribution by multiple parties of new ideas and code fragments for a collective project. Any developer can change any line of code to add functionality, fix bugs, improve designs, or refactor. No one person needs to become a bottleneck for changes. In a related embodiment, code is added to the block whenever a unit test is complete, or an integration test is completed. Unit testing is a software development process in which the smallest testable parts of an application, called units, are individually and independently scrutinized for proper operation. Unit testing is often automated, but it can also be done manually.

When a transaction is related to the completion of an integrated test, the system according to the present invention may decide to include information related to the integrated modules onto the historic stakeholder's application history blockchain. In some sense, the present system may automatically establish an audit trail by obtaining historical local information concerning historic programmer blockchain.

In one embodiment, when a GUI (graphical user interface) element on the code editor shown on a computer display is selected, a block may be written to the blockchain, along with the Programmer ID, Coded Editor (ID), etc.

In some sense, the code editor, or the "blockchain add feature", may change its color or blink based on risk assessment and code cohort/context on a GUI; alternatively, an audio command may be communicated to the programmer. The risk assessment may be based on the analysis of the likelihood that the added code may cause risk to the application under development. Of course, if the button is pressed, the system could indicate to the user, "Are you sure?"

It should be noted that design by contract (DbC), also known as contract programming, programming by contract, and design-by-contract programming, is an approach for designing software. "It prescribes that software designers should define formal, precise and verifiable interface specifications for software components, which extend the ordinary definition of abstract data types with preconditions, postconditions and invariants. These specifications are referred to as "contracts". See https://en.wikipedia.org/wiki/Design_by_contract.

"The DbC approach assumes all client components that invoke an operation on a server component will meet the preconditions specified as required for that operation. Where this assumption is considered too risky (as in multi-channel client-server or distributed computing) the opposite 'defensive design' approach is taken, meaning that a server component tests (before or while processing a client's request) that all relevant preconditions hold true, and replies with a suitable error message if not."

If desired, each code project may be registered into the blockchain through each code project registration transaction, wherein the mission associated with the code project purpose (for example, an e-commerce Website, a productivity tool, or an image editor), owner (and detailed information of the code project and overall code) will be stored onto the historic code blockchain. Any event "related" to the code (hardware maintenance/updates, software update, purpose or code project mission change, etc.) may be tracked and stored on historic application blockchain.

The code overall owner and packager (for example, a company) may be required to implement a tamper-proof module for the code.

The distributed ledgers associated with the present invention may belong to or be associate with a company, service/supplier, distributed renting/licensing services, etc.

Blockchain mining of related codes: Interestingly and optionally, the system of the present invention may facilitate mining the blockchains of other codes/projects that are related. A relevance parameter may be controlled or self-adjusted based on the mission or purpose for a software application.

The system, may mine the block to determine that codes or coders are exhibiting erratic behavior (with a confidence level C). The erratic behavior may be intentional or unintentional (for example, error), comprising violation of coding standard, breaching of S&P (security and privacy), or compliance guidelines, etc.

The determination of S&P or compliance violations may trigger the taking of further actions depending on the level of the breach or the violation, or the risk level due to the violation or breach. The action may be sending a signal to authorities, a monetary fine, coding/coder restriction, flagging, or alerting (for example, if the code or coder violated HIPPA standards, or if the coder/programmer violated coding standards, including naming conventions, etc.) Accessibility testing may include compliance with standards, such as the Americans with Disabilities Act of 1990.

Certificate of Authenticity (COA): Optionally, each registered software project, piece of code, or application may come with a COA, a built-in unique cryptographic ID and the complete ownership and/or development history. The COA can be verified anytime and printed out. Optionally, the system of the present invention can help users transfer or lend a piece of code from one code service to another.

Additionally, and optionally, the present invention relates to adapting blockchain technology for the storage of complaints regarding code, code functioning, and coders in an electronic tally system. The system could include a distributed network of voting/commenting modules or features modules in communication with each other. Each voting/rating module may also be associated with a network communications device and a computer system running a voting/rating client. Votes/ratings are received and stored securely on a blockchain. The tally for various coders and/or pieces of code is updated and stored as each vote/rating/comment is received and counted. This creates an audible trail of votes/ratings and the tally which can be used to detect, correct, and deter (or at least track) security concerns in the voting/rating process.

Optionally, upon the first registration of a piece of code, the system may assign a single token to the code; the token is also provided to one or more owners. Any transaction related to the code may include the "single token" of the code. For example, a query for fetching the details of all or part of a code may pass the "single token" and a public key. Any authorized entity connected to this system may verify the identity of that code as long as they present the token as part of the transaction.

As stated above, one aspect of the present invention includes a method of validating, by validating devices, code transactions based on several chaincodes. The validation devices or modules may be based on the open blockchain technology, which is based on the principle of permissioned network, or is based on the permission-less blockchain technology, wherein validating devices establish a validity of the transaction and generate a new block via a "proof-of-work" principle. In the present invention, the focus is on the use of open blockchain technology.

The present invention may provide systems and methods in which chaincodes (computer programs deployed at each validating device/node) can be used to track or validate transactions triggered based on a programmer activity regarding the code (for example, UNIT TEST completion, PUSH to code repository).

The chaincode block of the validating devices or modules may take into consideration S&P (security and privacy) tokens.

Validation devices or modules can execute chaincodes by obtaining a historical block identifier of the code historical blockchain. The code historical blockchain represents a chronicle of code/programmer activities, for example, a particular rating, code history, historic coding, and testing logs of code testers. The system may also include receiving a validity requirement with respect to a code programmer, feedback or comments, programmer estimated skill and behavior, coding actions indicating criteria that must be met in order for the validation system to accept a validation event with respect to the transaction. Adherence to coding best principles and compliance regulations and standards may be encoded in the chaincode to validate the code behavior with respect to the regulations or standards.

In other embodiments, coding devices or modules may be part of the IOT (Internet of Things) network to access code use and programming information, collect and upload information about the environment (for example, operating system versions) into the code blockchain, wherein the collection of the environment data is based on instrumentation of the environment, possibly using other software sensors and trackers. The validation devices continue executing the chaincode for upload transaction by obtaining a historical block identifier of the uploading code historical blockchain.

In additional embodiments, various customized analytics services may be employed to compute and generate a timeline analysis (for example, number of bugs reported/fixed, number of programmers involved, etc.) of a particular software module evolution obtaining a historical block identifier of the code historic blockchain.

The present invention may automatically determine or measure the coding or software engineering skill/competence of a programmer based on the historic contributions, aggregated credit received, and/or current rank/rate with respect to a particular programming or software engineering skillset. For example, our customized analytics engine, by obtaining a historical block identifier of the programmer's historic blockchain, may recommend that the programmer ranked highest on testing (made the highest contributions so far on testing).

The present blockchain-based system and method is so useful in the freelancing space for small businesses which often depend on crowdsourced freelancers for their software product development. Our customized analytics services may facilitate the matching of freelancers with businesses who need them by obtaining historical information about the programmers from the programmer's historic blockchain.

Coding data can be logged into the blockchain system wherein any transaction that writes or reads data to/from the blockchain system is managed by consensus. Each software application, and possibly programmer, is a registered member through the blockchain membership system (PKI system—public key infrastructure (PKI) is a set of roles, policies, and procedures needed to create, manage, distribute, use, store, and revoke digital certificates and manage public-key encryption). PKI generates the right public-private pair associate to each code/programmer, wherein each data uploading or accessing transaction is cryptographically signed using private key, including providing all the required credentials needed for the creation and/or invocation of transactions. Therefore, the present invention is based on IBM's blockchain fabric membership services on top of a Public Key Infrastructure (PKI). The membership services validate peers' identity, register all software workproducts/coders (participating as validating peers or non-validating peers) in the system for code/application tracking, security, and auditing.

The blockchain network can also maintain the coding history and certain operational aspects of the code through its lifetime. The present invention may also optionally implement advanced analytics/learning models (for example, code/coder behavior models, incident data) on top of the open blockchain. Thus, the system may only allow authorized entities (code, a programmer, regulators, etc.) to access data and models.

In some other embodiments, the system may learn the environment context from crowdsourcing wisdom, other blockchain controlled data sources, etc. In-program sensors may have a feed information for analytics and deep learning to assess code behavior (for example, stressed, tired, bored), etc.

The hash of the feed from in-program sensors may be stored in the historic application blockchain. This information may be analyzed to verify that the code, in some sense, is about to violate or has violated regulatory restrictions or security restrictions. The raw data of the developer team may be stored onto separate databases, wherein the management and consistency between the hash values and the actual data may be controlled by the execution of chaincode.

Our customized analytics modules may use the historical application event blockchain and said databases for detecting or identifying that activities of the application are in compliance with the agreements, which are encoded as chaincode and deployed on the blockchain network, specified by the stakeholders.

Note that the present system and method of validating any transaction related to the application creation events may take into consideration the purpose and mission of the code.

An automatic code location device/sensor may upload the application's current location (for example, company, server, geolocation of server, if relevant, hardware type), route taken when code is transmitted over the network, journey map on to the blockchain using the application's "single token." In many countries where intellectual property rights are not enforced, thefts of code may be more common. Although not the present invention, our invention service may help to prevent this, and the present invention may be very useful for preventing code theft, illegal code usage or selling.

In other embodiments, on top of trusted and immutable application-related longitudinal data, our invention may employ various intelligent services: such as cohorts of the applications, historic review of the application and responsible application coding behavior, historic sentiment (positive or negative sentiment) of the application or coder behavior, etc. These services may be available as built-in functions via Restful APIs (application programming interfaces) for application developers, law enforcement, judiciary service, and even for patent lawyers.

Coding patterns and anomaly detection: Coding patterns can be modeled by a suitable generative probability distribution, possibly using non-parametric methods (for example, kernel density estimation). Various summary statistics of the coding sessions (for example, average speed of coding, average number of active programmers, etc.) can also be computed. These summary statistics can be computed individually for different days of the week and for different hours of the day.

These probabilistic models can be used to detect anomalies in coding or application running patterns. This can be done by estimating the probability of a coding or running event under the fitted probabilistic model and flagging it as an anomaly if the probability drops below a suitably chosen threshold. The choice of threshold can be dictated by the risk level. Anomalous coding or executor patterns can then be marked for further manual inspection by subject matter experts, security professionals, compliance experts, etc.

Protocol violation detection (early warning): A "moderator" can define a coding or execution or testing protocol for a given project or distribution of code. The protocol can be defined in terms of thresholds on various attributes (for example, maximum number of app running or coders coding at a given point, etc.). The moderator activities may be encoded in our chaincode and deployed in the blockchain block. The attributes of the code or coders can be compared against the protocol, and the code or coders violating the protocol can be warned to comply. Predictive models of code executions and testing may also be used to send an early warning to the coders that are suspected of violating these protocols in near future.

Examples of customized built-in functions are:

History (token): This function returns the history of the code use, testing, development (either in the last few minutes while in a risky situation or for longer periods of time).

Journey (token, T): This function returns the "journey map" of the code (that is, its development path, testing, and use for the last T time units). This may be useful for application tracking and validating companies involved with security and risk.

Compliance (token, L): This function may return the S&P (security and privacy) or compliance level. Such services may be useful for IBM (and the likes) legal office which perform the application's naming convention, use of external source code, etc. before the application or software is available for external use.

GenFeedback (UID, C): This function may generate and return a recommendation (for example, skill level, aggregated rank, etc.) for a programmer UID (unique identifier) for a particular context C (for example, coding in Java, unit testing, front end developer: mobile vs. web, middleware developer, etc.). This function is also useful for selecting or prioritizing a freelancer in crowdsourced freelancer community; it may be used internally within an organization to determine or measure the expertise level of an employee such that appropriate reward or promotion can be given based on trusted data.

Although the present invention is targeted to the area of coding, version control, and credit for programmers, in principle the invention can be extended to other similar kinds of domains, such as when people collaborate on speeches, books, a blockchain-Wikipedia of the future, collaborative work in 3-D printed designs, etc. (for reward and credit assignment). This is useful for incentivizing/rewarding/crediting/measuring contributors to crowdsourcing or to general open-data communities. ("Of course, crowdsourcing also brings new challenges to data management, including quality assessment and improvement, latency, scheduling, cost optimization, privacy, and social issues. These issues and others lead to a wealth of research topics around systems, semantics, and user interfaces." http://www.vldb.org/pvldb/vol4/p1508-doan-tutorial4.pdf).

The present system can be used to confirm or refute a claim of authorship, or can even serve to identify likely author candidates from a set of developers. Where the target code set authorship is determined to be sufficiently suspect, the code set can be subjected to further scrutiny to thwart intrusion into the code repository.

While the present invention primarily focuses on the use of blockchain for program code credit and programmer contribution in a collective environment, the system and method may be used for issuing level (bigger, mid-level, experienced, expert, etc.) of freelancer by obtaining historic information about the programmer, and lifetime professional-level products contributions, wherein the professional-level products contributions may be of any of the following:
  requirements gathering;
  database design and development;
  services;
  user experience, graphic design;
  user interface development;
  deployment;
  testing; and
  performance monitoring and enhancement.

The present system may have a GUI for end-users to specify specific personal queries to obtain the professional level, wherein one or more of the built-in functions may be used to fetch, aggregate, analyze, and present the relevant information back to the end user's interface.

Finally, as has previously been noted above, it should be noted that, although our system keeps tracking and securely storing the programmers' contribution to code for an evolving software product, the codes related to said software product are only shared or visible to programmers or parties involved in the development or maintenance of said software system. In fact, this may be achieved by using IBM's open blockchain fabric (see details in the Appendix to follow).

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

APPENDIX

1) IBM Blockchain Fabric

IBM blockchain provides the infrastructure and fabric services for securely and transparently storing, tracking, and managing transactions on records. The blockchain contains a verifiable record of every single transaction ever made within the system. Once data are entered onto the blockchain, they can never be erased (immutability) or changed without introducing a new blockchain entry, thus ensuring auditability and verifiability of data.

The IBM blockchain system (also known as the "open blockchain" or "hyperledger fabric") is based on a distributed database of records of all transactions or digital events that have been executed and shared among participating parties. An individual transaction in the blockchain is validated or verified through a consensus mechanism incorporating a majority of the participants in the system. This allows the participating entities to know for certain that a digital event happened by creating an irrefutable record in a permissioned public ledger.

For example, transactions associated with any education entity (be it the record for a student, teacher, school, or asset) are compiled into a chain of "transaction blocks" that constitutes the lifelong record of what has happened to that entity. The chain can be considered a chronicle of an education entity's path through time. When a transaction is executed, its corresponding chaincode is executed by several validating peers of the system. The peers establish the validity of the transaction parameters and once they reach consensus, a new block is generated and appended onto the blockchain network.

The IBM open blockchain is a distributed ledger that persists and manages digital events, called transactions, shared among several participants, each having a stake in these events. The ledger can only be updated by consensus among the participants. Furthermore, once transactions are recorded, they can never be altered. They are immutable. Every such recorded transaction is cryptographically verifiable with proof of agreement from the participants, thus provided a robust provenance mechanism tracking their origination.

Typical solutions built on the IBM open blockchain fabric can be broken down into several components: membership service, validating peers, non-validating peers, and one or more client applications. All of these components jointly make up a blockchain application. In the context of a system for education, there can be multiple blockchains (e.g., longitudinal student chain, longitudinal teacher chain, longitudinal asset chain, etc.), each one having its own operating parameters and security requirements. Membership services manage data access. Validating peers are designated nodes that participate in consensus algorithms. They are responsible for validating the data that gets persisted on the blockchain and also for the execution of logic called chaincode against the data contained in the ledger. Non-validating peers maintain request services from membership services and validating peers on behalf of external client applications.

2) Security and Privacy

All users who wish to make use of the IBM open blockchain must register using the membership services by proving proof of ownership of identity. All new chaincodes are announced and published to the blockchain network by a registered user acting as a chaincode author (developer) by executing a deployment transaction. Such a transaction is first received by a peer or validator, and then propagated in the entire network of validators. Registered users are then allowed to invoke registered chaincode functions as part of the execution of transactions.

The IBM open blockchain contains a Public Key Infrastructure (PKI) which is a framework based on public key cryptography that ensures not only the secure exchange of data over public networks but also affirms the identity of the other party. The PM manages the generation, distribution and revocation of keys and digital certificates. Digital certificates are used to establish user credentials and sign messages. Signing messages with a certificate proves the identity of the message originator and protects the message from being altered. The PM has a Certificate Authority (CA), a Registration Authority (RA), a certificate database, and certificate storage. The RA is a trusted party that authenticates users and vets the legitimacy of data, certificates or other evidence submitted to support the user's request for one or more certificates that reflect that user's identity or other properties. A CA, upon advice from an RA, issues digital certificates for specific uses and is certified directly or hierarchically by a root CA.

What is claimed is:

1. A system comprising:
   a plurality of computer nodes, said plurality of computer nodes forming a distributed network for collaborative work, wherein each of said computer nodes of the plurality communicates directly with each of the other computer nodes of the plurality, each of said computer nodes being operated by a user in accordance with a common smart contract to produce a computer software program collaboratively with other users using blockchain, wherein contributions of each of said users for said computer software program are entered into the blockchain at respective computer nodes as blocks when each of said contributions has been made in accordance with the following:
   writing a portion of said computer software program for inclusion in said computer software program; and
   submitting said portion for inclusion in said computer software program to said distributed network to make a contribution to add a block with said portion to said blockchain for said computer software program, said contribution including an indication of the user making the contribution,
   said distributed network then:
   detecting the submission of said portion for said computer software program;
   adding the portion as a block to said blockchain for said computer software program;
   tracking the contributions of individual users;
   verifying the contributions of individual users against an instance of the computer software program by requesting an assessment of a contribution history of the instance of the computer software program; and
   detecting and/or identifying activities of code work product, wherein detecting and/or identifying activities of code work product are in compliance with agreements specified by stakeholders and are based on customized analytics modules using historical code event blockchain databases.

2. The system as claimed in claim 1, further comprising:
   adding, by a user, one or more of the following customized parameters as a block to said blockchain:
   a chronicle of contributions to said computer software program through the "life", or for a period of time, T, of said computer software program and through versions of said computer software program;
   identification of users programming said computer software program;
   ratings of additions to said computer software program;
   one or more lines of said computer software program, debug outcomes, and quality/efficiency of said computer software program;
   one or more units of source code, sets of one or more computer program modules together with associated control data, usage procedures, and operating procedures;
   a code module, function or procedure, an entire interface, an individual method, short code fragments created by users or by white box testers during the development process;
   greenness of said computer software program, storage efficiency, and/or CPU efficiency;
   comprehensibility ratings of said computer software program, and dates of additions;
   role of the programming user;
   coding work-items and types of work-item;
   updating the status of the work-item/product;
   time spent in each stage of progress; and
   a multidimensional vector related to unit test outcomes, storage efficiency, assessment of comprehensibility for different cohorts/teams of coders, and code compliance parameters.

3. The system as claimed in claim 1, further comprising:
sending, by a user, computer software program contribution parameters corresponding to said computer software program to one or more validation devices or modules to establish a validity of the transaction, and to generate a new block to be appended to the blockchain.

4. The system as claimed in claim 1, further comprising:
storing data on said computer software program in an electric tally system including a distributed network of voting/commenting features or modules in communication with one another.

5. The system as claimed in claim 1, further comprising:
storing at least one of votes and ratings on the block in said blockchain, and updating tallies of said at least one of votes and ratings when they are received.

6. The method as claimed in claim 1, wherein the blockchain comprises at least one code security block, said at least one code security block including one or more of the following:
coder/user location, coder/user capabilities, coding behavior of coder/user, code editor model, and contextual information related to security concerns.

7. The system as claimed in claim 1, further comprising:
mining blockchains of other computer software programs related to said computer software program.

8. The system as claimed in claim 1, further comprising:
mining said blockchain to determine computer software programs exhibiting, or having the potential to exhibit, erratic operating behavior.

9. The system as claimed in claim 1, wherein said distributed network of computer nodes implements the common smart contract to determine that coders/users are meeting their agreements with respect to coding by enabling coders/users to view blockchain contributions made by other coders/users.

10. The system as claimed in claim 1, wherein a determination of security and privacy (S&P) or compliance violation causes further actions depending on level of a breach or violation or a risk level due to said violation or breach.

11. The system as claimed in claim 1, further comprising selecting a graphical user interface element on a code editor shown on a computer display to trigger the addition of code content to the block.

12. The system as claimed in claim 1, wherein an audit trail is automatically established by obtaining historical block concerning a historic programmer blockchain.

13. The system as claimed in claim 1, wherein coding or software engineering skill/competence of a programmer is determined by obtaining on the historic contributions, aggregated credit received, current rank/rate with respect to a particular programming or software engineering skillset.

14. A method for a plurality of computer nodes, said plurality of computer nodes forming a distributed network for collaborative work, wherein each of said computer nodes of the plurality communicates directly with each of the other computer nodes of the plurality, each of said computer nodes being operated by a user in accordance with a common smart contract to produce a computer software program collaboratively with other users using blockchain, wherein contributions of each of said users for said computer software program are entered into the blockchain at respective computer nodes as blocks when each of said contributions has been made in accordance with the following:
writing a portion of said computer software program for inclusion in said computer software program; and
submitting said portion for inclusion in said computer software program to said distributed network to make a contribution to add a block with said portion to said blockchain for said computer software program, said contribution including an indication of the user making the contribution;
said method comprising:
detecting, by the distributed network, the submission of said portion for said computer software program;
adding the portion as a block to said blockchain for said computer software program;
tracking the contributions of individual users; and
verifying the contributions of individual users against an instance of the computer software program by requesting an assessment of a contribution history of the instance of the computer software program; and
detecting and/or identifying activities of code work product, wherein detecting and/or identifying activities of code work product are in compliance with agreements specified by stakeholders and are based on customized analytics modules using historical code event blockchain databases.

15. The method as claimed in claim 14, further comprising:
adding, by a user, one or more of the following customized parameters as a block to said blockchain:
a chronicle of contributions to said computer software program through the "life", or for a period of time, T, of said computer software program and through versions of said computer software program;
identification of users programming said computer software program;
ratings of additions to said computer software program;
one or more lines of said computer software program, debug outcomes, and quality/efficiency of said computer software program;
one or more units of source code, sets of one or more computer program modules together with associated control data, usage procedures, and operating procedures;
a code module, function or procedure, an entire interface, an individual method, short code fragments created by users or by white box testers during the development process;
greenness of said computer software program, storage efficiency, and/or CPU efficiency;
comprehensibility ratings of said computer software program, and dates of additions;
role of the programming user;
coding work-items and types of work-item;
updating the status of the work-item/product;
time spent in each stage of progress; and
a multidimensional vector related to unit test outcomes, storage efficiency, assessment of comprehensibility for different cohorts/teams of coders, and code compliance parameters.

16. The method as claimed in claim 14, further comprising:
sending, by a user, computer software program contribution parameters corresponding to said computer software program to one or more validation devices or modules to establish a validity of the transaction, and to generate a new block to be appended to the blockchain.

17. The method as claimed in claim 14, further comprising:

storing data on said computer software program in an electric tally system including a distributed network of voting/commenting features or modules in communication with one another.

18. The method as claimed in claim 14, further comprising:
- storing at least one of votes and ratings on the block in said blockchain, and
- updating tallies of said at least one of votes and ratings when they are received.

19. The method as claimed in claim 14, wherein the blockchain comprises at least one code security block, said at least one code security block including one or more of the following:
- coder/user location, coder/user capabilities, coding behavior of coder/user, code editor model, and contextual information related to security concerns.

\* \* \* \* \*